US012549011B2

(12) United States Patent
Falk et al.

(10) Patent No.: US 12,549,011 B2
(45) Date of Patent: Feb. 10, 2026

(54) METHOD FOR OPERATING AN ENERGY GENERATING SYSTEM, AND ENERGY GENERATING SYSTEM COMPRISING SAID METHOD

(71) Applicant: SMA Solar Technology AG, Niestetal (DE)

(72) Inventors: Andreas Falk, Kassel (DE); Dirk Hermeling, Petershagen (DE)

(73) Assignee: SMA Solar Technology AG, Niestetal (DE)

( * ) Notice: Subject to any disclaimer, the term of this patent is extended or adjusted under 35 U.S.C. 154(b) by 902 days.

(21) Appl. No.: 17/716,067

(22) Filed: Apr. 8, 2022

(65) Prior Publication Data

US 2022/0231513 A1      Jul. 21, 2022

Related U.S. Application Data

(63) Continuation of application No. PCT/EP2020/075742, filed on Sep. 15, 2020.

(30) Foreign Application Priority Data

Oct. 9, 2019    (DE) .................... 10 2019 127 198.3

(51) Int. Cl.
    *H02J 3/38*       (2006.01)
    *H02J 7/35*       (2006.01)
(52) U.S. Cl.
    CPC ............... *H02J 3/381* (2013.01); *H02J 7/35* (2013.01); *H02J 2300/24* (2020.01)
(58) Field of Classification Search
    CPC .......... H02J 3/381; H02J 7/35; H02J 2300/24; H02J 1/082; H02J 1/084; H02J 1/086; H02J 1/101; Y02E 10/56
    See application file for complete search history.

(56) References Cited

U.S. PATENT DOCUMENTS

2009/0266397 A1*  10/2009  Gibson ................... H02S 40/38
                                                           320/101
2010/0295377 A1    11/2010  Sok et al.
                                     (Continued)

FOREIGN PATENT DOCUMENTS

DE          10136147 A1     2/2003
DE        10201311869 A1    5/2014
                                     (Continued)

OTHER PUBLICATIONS

International Search Report Dated Oct. 27, 2020 for International Application No. PCT/EP2020/075742.

*Primary Examiner* — Julian D Huffman
*Assistant Examiner* — Johali A Torres Ruiz
(74) *Attorney, Agent, or Firm* — Eschweiler & Potashnik, LLC

(57) ABSTRACT

The application relates to a method for operating an energy generating system including a plurality of DC sub-generators which are connected in parallel with one another and in each case to a shared DC load via a DC/DC converter. Each of the DC sub-generators includes a DC source which is connected, via at least one fuse that is connected in series to the DC source, to the particular DC/DC converter that is assigned to the corresponding DC sub-generator. The method includes monitoring each of the DC sub-generators for a fault, in particular a short-circuit fault; —wherein, if the monitoring of the DC sub-generators indicates a faulty DC sub-generator; —the DC/DC converters that are not assigned to the faulty DC sub-generator are operated at a common total current $I_{Rest}$ which corresponds to a default value. The application also relates to an energy generating system which is designed and configured to carry out the method.

13 Claims, 3 Drawing Sheets

(56) References Cited

U.S. PATENT DOCUMENTS

| | | | |
|---|---|---|---|
| 2012/0319489 A1 | 12/2012 | McCaslin et al. | |
| 2013/0222951 A1 | 8/2013 | Zhu et al. | |
| 2014/0049263 A1* | 2/2014 | Takala | G01R 31/74 |
| | | | 324/550 |
| 2014/0192570 A1* | 7/2014 | Nielsen | H02J 3/46 |
| | | | 363/50 |
| 2015/0115736 A1* | 4/2015 | Snyder | H02J 7/0048 |
| | | | 307/115 |
| 2015/0280423 A1* | 10/2015 | Bremicker | H02M 3/155 |
| | | | 307/71 |
| 2016/0181781 A1 | 6/2016 | Luebke et al. | |
| 2017/0054291 A1 | 2/2017 | Qi et al. | |
| 2018/0034446 A1* | 2/2018 | Wood | H02M 7/217 |
| 2018/0210022 A1 | 7/2018 | Tomita et al. | |
| 2019/0052187 A1* | 2/2019 | Geske | H02M 1/32 |
| 2020/0119634 A1* | 4/2020 | Perkiö | H02M 1/32 |
| 2020/0303922 A1* | 9/2020 | Fukuhara | H02J 1/12 |

FOREIGN PATENT DOCUMENTS

| | | |
|---|---|---|
| DE | 112012007202 B4 | 12/2021 |
| JP | 2015504208 A | 2/2015 |
| JP | 2016506227 A | 2/2016 |
| KR | 101695672 B1 | 1/2017 |

\* cited by examiner

METHOD FOR OPERATING AN ENERGY GENERATING SYSTEM, AND ENERGY GENERATING SYSTEM COMPRISING SAID METHOD

CROSS REFERENCE TO RELATED APPLICATIONS

This application is a continuation of International Patent Application number PCT/EP2020/075742, filed on Sep. 15, 2020, which claims priority to German Patent Application number 10 2019 127 198.3, filed on Oct. 9, 2019, and is herby incorporated by reference in its entirety.

FIELD

The disclosure relates to a method for operating an energy generating system (EEA). The disclosure relates in particular to the operation of an EEA, in which a case of a fault in the EEA is detected and its damaging effect on components of the EEA is avoided or at least reduced.

BACKGROUND

In the so-called power-to-gas method, electrical energy is converted by an electrolyzer to a gaseous energy carrier, in particular to hydrogen. The electrical energy can advantageously be renewable electrical energy. In such methods, the electrolyzer and the renewable EEA supplying the electrolyzer can be connected to one another in the form of an island network, which is not connected at all or only temporarily connected to a public power grid (EVN) operating with an AC voltage.

Many of the renewable energy sources are often inherently designed as DC sources. Since the electrolyzer operates as a DC consumer, it is advantageous with regard to avoiding conversion losses if the island network is also designed as a DC network. For example, the EEA within the island network can have a plurality of DC sub-generators designed as photovoltaic (PV) sub-generators, which are connected in each case via a DC/DC converter and in parallel with one another to an input of the electrolyzer or another DC load. A voltage of the DC sub-generators can be decoupled via the DC/DC converters from a voltage at the input of the electrolyzer. Each of the DC sub-generators can thus be operated at its respective maximum power point (MPP) and can nevertheless supply the electrolyzer with an output voltage that is the same for all DC/DC converters. An operating point of the electrolyzer, in particular its power consumption, can be set via the output voltage of the DC/DC converters. Specifically, a higher-level control unit can control the output voltage of the DC/DC converters in such a way that, on the one hand, there is always an equilibrium between the total generated and consumed power in the island network and, on the other hand, the maximum possible power of renewable power of the PV sub-generators can always be harvested.

Now, if one or possibly even several of the PV sub-generators operating as DC sub-generators have a fault, for example a short-circuit fault or a double insulation fault, the DC sub-generators operating without faults feed their power into the one faulty DC sub-generator (or, where applicable, into the plurality of faulty DC sub-generators). Usually, a DC sub-generator comprises one or more DC sources. The DC sources of a DC sub-generator, depending on the size of the EEA, are connected via one or more fuses to the DC/DC converter assigned to the DC sub-generator. However, in the case of a questionable fault within the EEA, it may happen that a resulting current from the fault-free DC sources of the EEA into the faulty DC source is not sufficiently high to trip at least one of the fuses via which the faulty DC source is connected to its assigned DC/DC converter. Thus, there is the risk that, in the case of a fault, the generated fault current is not sufficient without further measures to separate the faulty DC source from the remaining DC sources, which operate in a fault-free manner, by tripping a fuse downstream of the faulty DC source. The resulting current representing a fault current is not reliably interrupted and, depending on the current strength and duration of the fault current, can damage or even destroy further components of the EEA, in particular the DC/DC converter concerned.

Document DE 10 2015 007 443 A1 discloses a method and a device for supplementarily feeding current from at least one power source into a final power network having several consumption points. The final power network is connected to a higher-level power supply, wherein the consumption points are protected against the higher-level power supply via at least one overcurrent fuse. A control unit detects the current flowing from the higher-level power supply and the current flowing from the power source into the final power network. The instantaneous total value formed from the currents is compared with a predetermined maximum current in order to reduce the current coming from the current source when the maximum current is exceeded. The method can prevent an overload situation in the final power network.

Publication DE 10 2013 111 869 A1 discloses a PV system with an inverter, which is connected to a power grid via an AC disconnecting means, and at least one PV sub-generator, each of which has at least one PV string and is connected via DC lines to a DC connection area of the inverter. A DC separator close to the generator, a DC short-circuit switch downstream of the energy flow direction during feeding for short-circuiting the at least one PV string, and a reverse current protection downstream of the DC short-circuit switch in the energy flow direction are assigned to the PV sub-generator. Furthermore, an AC short-circuit switch is arranged in the energy flow direction upstream of the AC disconnecting means.

A photovoltaic (PV) system with an arc detection device is known from publication US 2018/210022. In the PV system, a PV string is connected to a power converter via first power lines, a DC-DC converter, and further power lines. The arc detection device comprises capacitors, which form bypass current paths for the DC-DC converter, and a current sensor arranged on one of the further power lines between the DC/DC converter and the power converter.

Publication DE 11 2012 007 202 T5 describes a method for operating a controller for maximum power point tracking (MPPT controller), which is designed to transmit power between an input terminal and an output terminal, comprising the following steps:

In a first operating mode of the MPPT controller: operating a first switching device of the MPPT controller at a fixed duty cycle; and In a second operating mode of the MPPT controller: causing a regulating switching device of the MPPT controller to repeatedly switch between its conductive and non-conductive states in order to maximize a power taken from a PV device electrically connected to the input terminal.

Publication US 2016 181781 A1 discloses a PV string having a plurality of PV modules which are electrically connected in series and have a first end and a second end. A power line with a first string protection unit is electrically connected to the first end, and a return line having a second string protection unit is connected to the second end. One of the string protection units comprises a plurality of protective devices selected from overcurrent protection, arc fault protection, reverse current protection, and ground fault protection. The other of the string protection units comprises a plurality of protective devices selected from overcurrent protection, arc fault protection, reverse current protection, ground fault protection, and a remote-controlled switch in series with the power line or the return line.

A PV system with a plurality of PV modules and their assigned DC/DC converters, which are connected in parallel with one another to a central inverter on the output side, is known from publication DE 101 36 147 A1. The inverter converts a DC link voltage generated by the DC/DC converters into a sinusoidal AC voltage. The PV modules are electrically decoupled by their individual DC/DC converters.

SUMMARY

The disclosure is directed to a method for operating an EEA with a plurality of DC sub-generators connected in parallel with one another, with which damage to the EEA is reliably avoided in the case of a fault. In one embodiment, the method operates to separate a faulty DC source of a DC sub-generator from the remaining DC sources, which operate in a fault-free manner, by tripping a fuse, if possible. However, the resulting fault current is to be controlled such that damage to components of the EEA, which are sensitive to overcurrent, is ruled out in any case, even if tripping the fuse is not possible. Also disclosed is an EEA suitable for performing the method.

The method according to the disclosure is aimed at the operation of an energy generating system (EEA) with a plurality of DC sub-generators, which are connected in parallel with one another and in each case via a DC/DC converter to a shared DC load. Each of the DC sub-generators has at least one DC source, which is connected, via at least one fuse that is connected in series to the DC source, to the DC/DC converter that is assigned to the respective DC sub-generator. The method comprises: monitoring each of the DC sub-generators for a fault, in particular a short-circuit fault, and if the monitoring of the DC sub-generators indicates a faulty DC sub-generator, the DC/DC converters that are not assigned to the faulty DC sub-generator but rather to a fault-free DC sub-generator are operated at a common total current $I_{Rest}$ which corresponds to a default value.

Each of the DC sub-generators may have a DC source or a plurality of DC sources connected in parallel with one another to the corresponding DC/DC converter. The fuse can be arranged in each case, in relation to a power flow direction during normal operation of the EEA, between the DC source and the DC/DC converter. The fuse can be merely one fuse, or may be a plurality of fuses, which are arranged in a series connection between the DC source and the DC/DC converter. In one embodiment, one pole of the DC source is connected to the corresponding DC/DC converter via the one fuse or the plurality of fuses connected in series. However, it is also within the scope of the disclosure that each of the two poles of the DC source is connected to the assigned DC/DC converter via a fuse or a plurality of fuses connected in series. In one embodiment, each of the DC/DC converters can accordingly be connected to one DC source on the input side. Alternatively, however, it is also possible for one, several, or even each of the DC/DC converters to be connected on the input side to a plurality of DC sources connected in parallel with one another. In one embodiment, when at least one of the DC/DC converters is connected to a plurality of DC sources on the input side, a power flow of the DC sources is combined in a cascading manner within the corresponding DC sub-generator in a plurality of stages. Each individual stage can have a separate fuse in one embodiment. For example, a so-called main string fuse can secure a generator box which in each case contains a plurality of so-called string fuses. In this way, a plurality of fuses of different types can be connected in series between a DC source and the DC/DC converter. In one embodiment, a tripping threshold of the fuses can increase with increasing distance from the DC source and with decreasing distance to the DC/DC converter.

Monitoring each of the DC sub-generators for faults may comprise, in one embodiment, monitoring an electrical parameter of the DC sub-generators. In one embodiment, a current and/or a voltage is detected in a temporally successive manner. In one embodiment, it is not necessary for each of the DC sources within a DC sub-generator to be monitored separately. In particular when a plurality of DC sources connected in parallel with one another is connected as one DC sub-generator to a shared DC/DC converter, it is sufficient to combine the DC sources in groups or, in other words, to monitor the corresponding DC sub-generator. During monitoring, it can be detected, for example, whether a return current flows into a faulty DC sub-generator which is affected by a short-circuit fault. Although the monitoring does not directly yield the faulty DC source, it still yields the DC sub-generator which contains the faulty DC source.

The disclosure makes use of the effect that, in the event of a fault, in particular in the event of a short-circuit fault of one of the DC sources, the voltage of the faulty DC source, as well as the voltage of the DC sub-generator that contains the faulty DC source, drops and causes a return current from non-faulty DC sources. The dropped voltage is applied, on the input side, to the DC-DC converter assigned to the faulty DC source, which DC-DC converter is therefore no longer able to provide a voltage on the output side that corresponds to the output-side voltage of the remaining DC/DC converters, which are not connected on their respective input sides to a faulty DC source or a faulty DC sub-generator. This results in a total current $I_{Rest}$ of those DC/DC converters that are not assigned to the faulty DC sub-generator, i.e., are not connected on the input side to the faulty DC sub-generator, into the faulty DC sub-generator and there, in particular, into the faulty DC source of the faulty DC sub-generator. The total current $I_{Rest}$ thus flows backward, i.e., counter to the current direction during normal operation of the EEA, via freewheeling diodes of the DC/DC converter that is assigned to the faulty DC sub-generator.

A fault of a DC source can also affect the EEA such that a voltage drop does not only take place at an output of the DC/DC converter that is assigned to the faulty DC source. Instead, a voltage drop can also be present more or less strongly at the outputs of all other DC/DC converters. In this case, the voltage drops to a small voltage value in an entire DC bus of the EEA. In this case, however, the voltage drop is usually more pronounced at the DC/DC converter that is assigned to the faulty DC source than the voltage drops at the remaining DC/DC converters that are not assigned to the faulty DC source, so that the already described total current $I_{Rest}$ from the fault-free DC sub-generators into the faulty DC sub-generator also results here.

According to one embodiment of the disclosure, only the DC/DC converters that are not assigned to a faulty DC sub-generator are operated with the aim that their common total current $I_{Rest}$ corresponds to a default value. This can take place by controlling, in a coordinated manner, the DC/DC converters that are not assigned to the faulty DC sub-generator. The coordinated control can take place using a control unit acting on all the DC/DC converters. In case of a coordinated control, the default value to be adjusted must be taken into account by the control unit. The control unit may be furthermore provided with the individual currents of all DC/DC converters participating in the coordinated control. However, this is not absolutely necessary. Rather, it is sufficient if the control unit, in addition to the default value to be adjusted, has available the common total current $I_{Rest}$ of the DC/DC converters participating in the coordinated control. The common total current $I_{Rest}$ may optionally also include a portion which flows from the DC load in the direction of the DC/DC converter that is assigned to the faulty DC sub-generator. Since fewer values need to be measured and/or communicated during the coordinated control, the coordinated control can be simplified overall and the corresponding control unit can be less sophisticated. A fault current corresponding to the total current $I_{Rest}$ thus does not flow in an uncontrolled manner but is controlled in particular in terms of its current strength in such a way that the total current $I_{Rest}$ corresponds to the default value. The default value can be selected such that damage to an overcurrent-sensitive component of the EEA, in particular of the DC/DC converter that is assigned to the faulty DC sub-generator or, in other words, that is assigned to the faulty DC source is ruled out. The overcurrent-sensitive component can in particular be a freewheeling diode of the corresponding DC/DC converter. On the one hand, the total current $I_{Rest}$ can be limited upward (i.e., not to exceed a predetermined amount) by means of the default value. On the other hand, however, by controlling the relevant DC/DC converters with the aim that the common total current $I_{Rest}$ corresponds to the default value, the total current $I_{Rest}$ is at the same time also limited downward (i.e., not to fall below a predetermined amount). Specifically, the default value can be selected such that the fuse connected in series to the DC/DC converter and the faulty DC source or, in the case of a plurality of fuses, one or more of the fuses connected in series to the DC/DC converter and the faulty DC source trip reliably. In the case of a DC sub-generator having a plurality of DC sources connected in parallel with one another, the fuse closest to the faulty DC source advantageously trips first for circuit reasons, since it usually has, on the one hand, relative to the other fuses within the DC sub-generator, a relatively low tripping threshold and is, on the other hand, passed through not only by the total current $I_{Rest}$ generated outside the faulty DC sub-generator but additionally also by a fault current generated within the faulty DC sub-generator. However, the fault current generated within the faulty DC sub-generator is generally significantly lower than the total current $I_{Rest}$ generated outside the faulty DC sub-generator. Both currents add up and thus support the desired tripping of the fuse in the case of a fault.

The current strength of the total current $I_{Rest}$ can be regulated or set to the default value by suitable operation of the DC/DC converters that contribute to the total current $I_{Rest}$. For this purpose, in one embodiment, a current flowing via the DC/DC converter can be detected for all DC/DC converters and transmitted to the higher-level control unit. The higher-level control unit can add up the detected currents of the DC/DC converters that are not assigned to a faulty DC sub-generator, and can calculate therefrom the currently present total current $I_{Rest}$. By comparing the currently present total current $I_{Rest}$ with the default value, the control unit can control the relevant DC/DC converters with the aim that the total current $I_{Rest}$ corresponds to the default value. If the total value $I_{Rest}$ exceeds or threatens to exceed the default value, at least one current ($I_2$-$I_n$) can be reduced by a respective one of the DC/DC converters that are not assigned to the faulty DC sub-generator. Alternatively, however, several or all currents ($I_2$-$I_n$) can be reduced by the respective ones of the DC/DC converters in order to set the total current $I_{Rest}$ to the default value. Conversely, if the total value $I_{Rest}$ falls below or threatens to fall below the default value, at least one current ($I_2$-$I_n$) can be increased by a respective one of the DC/DC converters, optionally even several or all of the currents can be increased by the respective ones of the DC/DC converters that are not assigned to the faulty DC sub-generator.

In one embodiment of the method, when monitoring the DC sub-generators for faults, a current flowing via the DC/DC converter can be detected for all DC/DC converters in each case. A faulty DC sub-generator can be indicated when the current flowing in the direction of the DC load from the DC/DC converter assigned to the DC sub-generator falls below a current threshold value $I_{TH}$ or, in particular, when the current flowing in the direction of the DC load from the DC/DC converter assigned to the DC sub-generator changes its current direction. In this case, a current flowing from the DC/DC converter in the direction of the DC load is evaluated as a positive current and a current flowing from the direction of the DC load to the DC/DC converter is evaluated as a negative current. According to this definition, a negative current flowing via the DC/DC converter in the direction of the DC load also indicates that a faulty DC sub-generator is connected on the input side to the relevant DC/DC converter. When the current flowing via the DC/DC converter is detected, an input current or an output current of the DC/DC converter can be detected.

Alternatively or cumulatively to detecting a current flowing via the DC/DC converter, it is likewise possible to detect a voltage of the DC sub-generator in each case for monitoring the DC sub-generators for faults. In this case, a faulty DC sub-generator is indicated when the voltage detected at the DC sub-generator falls below a voltage threshold value $U_{TH}$. The voltages can advantageously be detected on the input side at the DC/DC converters assigned to the respective DC sub-generators. Alternatively, however, the output voltages of the DC/DC converters can also be detected. Advantageously, measuring units which are already available in the DC/DC converters can be used during the detection of the voltages as well as during the detection of the currents.

In one embodiment of the method, the default value can be selected in such a way that a time integral formed from the total current $I_{Rest}$ exceeds an i2t value of an overcurrent-sensitive component of the DC/DC converter assigned to the faulty DC source or, in other words, of the DC/DC converter assigned to the faulty DC sub-generator. This prevents the overcurrent-sensitive component of the DC/DC converter(s) from being damaged as an overcurrent-sensitive component. Furthermore, in one embodiment, the default value can be selected in such a way that a time integral formed from the total current $I_{Rest}$ exceeds an i2t value of the fuse that is connected in series between the faulty DC source and the DC/DC converter assigned to the faulty DC source. Such selection of the default value has the aim of tripping the fuse and thus of separating the faulty DC source from the remaining non-faulty DC sources within the faulty DC sub-generator as well as from the remaining non-faulty DC sources outside the faulty DC sub-generator.

In the case of a fault occurring within the EEA, situations can occur in which tripping of the fuse that is connected in series to the faulty DC source does not take place even in the case of such a selection of the default value. This can be facilitated, for example, by component tolerances in conjunction with i2t values of the overcurrent-sensitive component and the fuse that are close to one another. In such a case too, however, the faulty DC sub-generator can be separated in a simple manner from the shared DC load and thus from the remaining non-faulty DC sub-generators. Specifically, when tripping the fuse at the selected default value does not take place, the DC/DC converters that are not assigned to a faulty DC sub-generator can be deactivated in order to set the total current $I_{Rest}$ to a current value of 0 A. In this way, a zero-current state is effected between the DC/DC converters, in which state the faulty DC source or the faulty DC sub-generator can be galvanically separated from the shared DC load via an electromechanical switching element. Such switching elements are usually already present in the EEA in question. However, since the switching action takes place in a zero-current state, it is not absolutely necessary for the switching elements to have arc-extinguishing means. They can therefore be designed significantly more cost-effectively.

In one embodiment of the method, a fault indicated during the monitoring of the DC sub-generators, optionally also a successful or an unsuccessful tripping of the fuse, can be signaled by the EEA. This can take place, for example, by a communication unit of the EEA. In this way, an operator of the EEA can accordingly be informed of the fault and correspondingly required repair measures in a timely manner. The operator can thus already take precautions in advance in order to carry out a repair of the faulty DC source or of the EEA as efficiently as possible.

An energy generating system according to the disclosure comprises a plurality of DC sub-generators which are connected in parallel with one another and in each case via a DC/DC converter to a shared DC load. Each of the DC sub-generators has one DC source, which is connected, via at least one fuse that is connected in series to the DC source, to the DC/DC converter that is assigned to the respective DC sub-generator. As a characteristic feature, the energy generating system furthermore comprises a control unit which is designed and configured to carry out the method according to the disclosure. The control unit can be a separately designed control unit of the EEA. Alternatively or cumulatively, however, it is also possible for the control unit to be contained within a control unit of a DC/DC converter or within a plurality of control units of the DC/DC converters. In other words, the control unit can thus also be distributed to the control units of a plurality of DC/DC converters of the EEA. The advantages already mentioned in connection with the method result.

In one embodiment of the EEA, the DC sub-generators each have a plurality of DC sources which are connected in parallel with one another via at least one fuse to the DC/DC converter assigned to the respective DC sub-generator. The DC sources can also each be connected via a series connection of a plurality of fuses to the DC/DC converter assigned to the respective DC sub-generator. In this case, a tripping threshold or the i2t value of the fuses can increase, the further the fuse is removed from the DC source in the series connection or, in other words, the closer the fuse is arranged to the corresponding DC/DC converter in the series connection. In a further embodiment of the EEA, the DC sources of one or more DC sub-generators can comprise a photovoltaic (PV) string and/or a battery. Furthermore, the shared DC load can in particular comprise an electrolyzer.

The EEA can comprise a step-down converter as DC/DC converter. Specifically, a DC/DC converter, a plurality of or possibly also all DC/DC converters of the EEA can each comprise a step-down converter and/or a DC/DC converter that has a step-down function, i.e., is designed and configured to convert an input voltage into a smaller output voltage. The overcurrent-sensitive component of the DC/DC converter assigned to the faulty DC source or, in other words, of the DC/DC converter assigned to the faulty DC sub-generator, can comprise a separate freewheeling diode connected in parallel with a semiconductor switch of the DC/DC converter. Alternatively, the overcurrent-sensitive component of the DC/DC converter can also comprise a semiconductor switch of the DC/DC converter, in particular a body diode of the semiconductor switch.

BRIEF DESCRIPTION OF THE FIGURES

The disclosure is illustrated below with the aid of figures. The following is shown.

DETAILED DESCRIPTION

The disclosure relates to a method for operating an energy generating system (EEA). The disclosure relates in particular to the operation of an EEA, in which a case of a fault in the EEA is detected and its damaging effect on components of the EEA is avoided or at least reduced. The EEA can in particular be a renewable EEA with a plurality of DC sub-generators which are connected in parallel with one another and in each case via a DC/DC converter to a shared DC load in order to supply the same. A case of a fault can exist in particular if one, possibly even several of the DC sub-generators, have a fault, for example a short-circuit fault. The disclosure furthermore relates to an EEA which is designed and configured for such a method.

Figure 1:
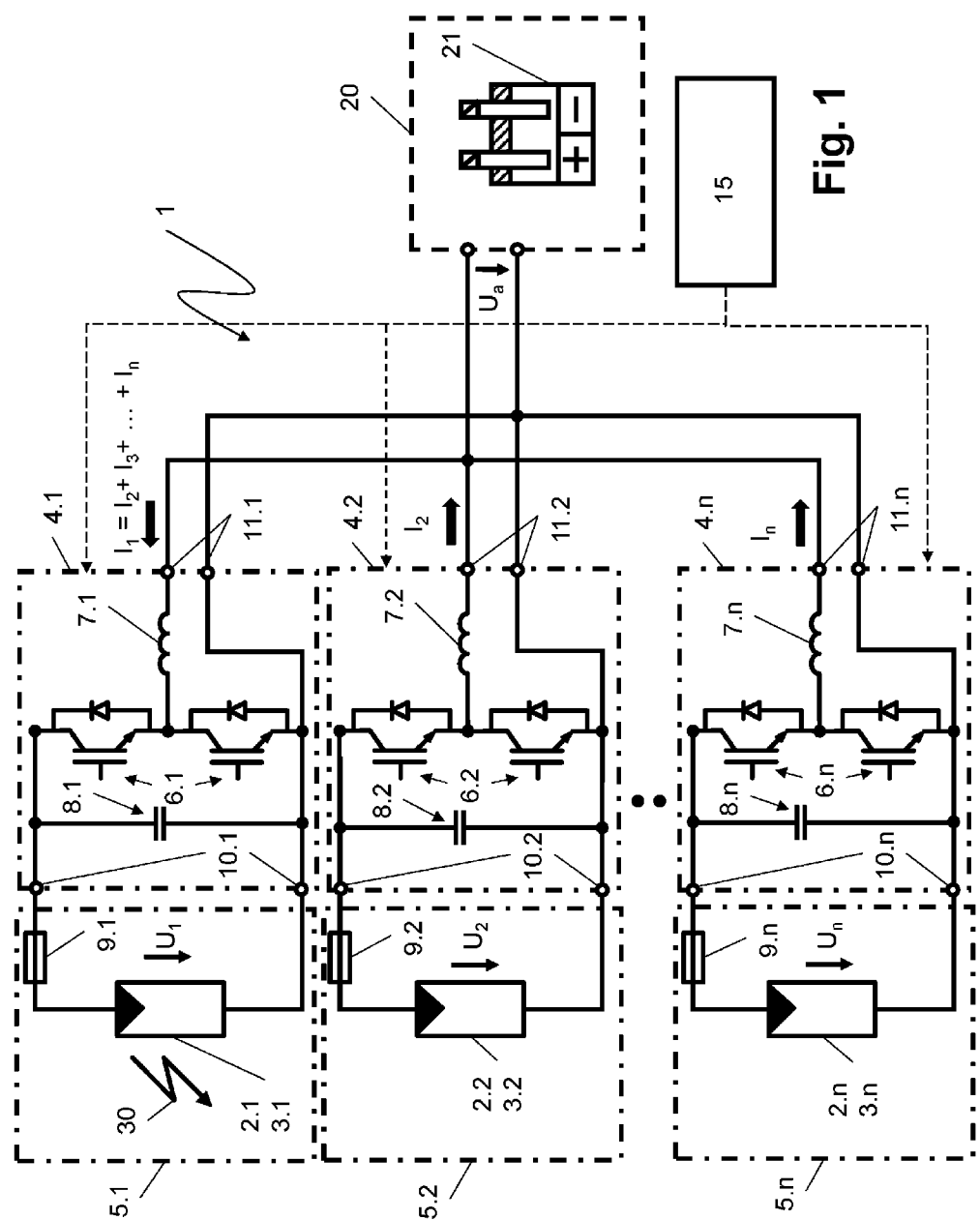
FIG. 1 shows an EEA according to the disclosure in a first embodiment.

FIG. 1 shows an EEA 1 according to the disclosure in a first embodiment. The EEA 1 comprises a plurality of DC sub-generators 5.1-5.$n$, which are connected in parallel with one another and in each case to a shared DC load 20, here illustrated for example as electrolyzer 21, via a DC/DC converter 4.1-4.$n$. The EEA 1 furthermore comprises a control unit 15 for controlling the DC/DC converters 4.1-4.$n$. The control unit 15 is configured to receive and analyze measured values for current and or voltage, which are detected by measuring units of the DC/DC converters 4.1-4.$n$. The control unit 15 is furthermore configured to control, alone or in conjunction with control units present in the DC/DC converters 4.1-4.$n$, the individual ones of the DC/DC converters 4.1-4.$n$ with the aim that the common total current $I_{Rest}$ generated by the individual ones of the DC/DC converters 4.1-4.$n$ corresponds to a default value. The DC/DC converters 4.1-4.$n$ are shown by way of example in FIG. 1 as step-down converters with an input 10.1-10.$n$ in each case, an input capacitance 8.1-8.$n$, that is connected to the input 10.1-10.$n$, two semiconductor switches 6.1-6.$n$ and an inductance 7.1-7.$n$ that is connected to an output 11.1-11.n of the DC/DC converter 4.1-4.n. However, according to the disclosure, it is also possible to use as DC/DC converter 4.1-4.n any type of DC/DC converter with a step-down function, i.e., which can convert an input voltage $U_1$-$U_n$ applied to the input 10.1-10.n into a smaller output voltage $U_a$ applied to the output 11.1-11.n. In the embodiment according to FIG. 1, each of the DC sub-generators 5.1-5.n includes only one DC source 2.1-2.n, which is connected via a fuse 9.1-9.n to the input 10.1-10.n of the DC/DC converter 4.1-4.n assigned thereto. Each of the DC sources 2.1-2.n is shown by way of example as a photovoltaic (PV) string 3.1-3.n. However, it is also possible for one or more of the DC sources 2.1-2.n to be a battery.

During normal operation of the EEA 1, the DC sources 2.1-2.n configured as a PV string 3.1-3.n are operated at their respective maximum power point (MPP). Here, a voltage $U_1$-$U_n$ of the respective DC source 2.1-2.n, which voltage is assigned to the respective MPP and applied to a respective input 10.1-10.n of the DC/DC converter 4.1-4.n assigned thereto, is converted into a shared output voltage $U_a$. The electrolyzer 21 as the shared DC load 20 is supplied with the output voltage $U_a$. This ensures that the maximum possible renewable power is always converted by the EEA 1 and supplied to the DC load 20.

During normal operation of the EEA 1, the DC sub-generators 5.1-5.n are each monitored for a possible fault 30, for example a possible short-circuit fault. Monitoring is carried out according to one embodiment of FIG. 1 such that any measuring devices (not shown in FIG. 1) already present in the DC/DC converters 4.1-4.n are used. The measuring devices can be used in each case to detect a voltage $U_1$-$U_n$ applied to the respective input 10.1-10.n of the respective DC/DC converters 4.1-4.n and/or a current $I_1$-$I_n$ flowing via the respective output 11.1-11.n of the respective DC/DC converters 4.1-4.n in the direction of the DC load 20. According to one embodiment, if one of the voltages $U_1$-$U_n$ applied to the inputs 10.1-10.n falls below a voltage threshold value $U_{TH}$ and/or if one of the currents $I_1$-$I_n$ flowing in the direction of the DC load 20 via the output of the DC/DC converters 4.1-4.n falls below a current threshold value $I_{TH}$, this is signaled to the control unit 15 by the corresponding DC/DC converter 4.1-4.n. Cumulatively or alternatively, it is also possible to transmit the values of the detected currents $I_1$-$I_n$ and voltages $U_1$-$U_n$ of the higher-level control unit 15, which then itself evaluates said values and detects an indication of a fault 30.

FIG. 1 illustrates by way of example a fault 30 in the form of a short-circuit fault at the DC source 2.1 of one of the DC sub-generators 5.1-5.n, here of the DC sub-generator 5.1. Due to the short-circuit fault, the voltage $U_1$ of the faulty DC source 2.1 drops to a very small absolute value. In this case, unlike the remaining DC/DC converters 4.2-4.n, the DC/DC converter 4.1 assigned to the faulty DC sub-generator 5.1 or, in other words, the DC/DC converter 4.1 assigned to the faulty DC source 2.1 is no longer capable of converting the voltage $U_1$ applied on the input side to the shared value $U_a$. Instead, an output voltage that is significantly smaller than the shared value $U_a$ is now also applied to the output of the DC/DC converter 4.1 assigned to the faulty DC source 2.1. Sometimes, there may be a drop not only in the output voltage of the DC/DC converter 4.1 assigned to the faulty DC source 2.1; it may also be possible that in response to the one faulty DC source 2.1, a voltage drop forms on an entire DC bus of the EEA 1, i.e., is present also at the DC/DC converters 4.2-4.n that are not assigned to the faulty DC source 2.1. However, the drop in output voltage at the DC/DC converter 4.1 assigned to the faulty DC source 2.1 is somewhat more pronounced than the drops in voltage at the other DC/DC converters 4.2-4.n. The at least slightly more pronounced drop in voltage at the output 11.1 of the DC/DC converter 2.1 results in a total current $I_{Rest}$ according to $I_{Rest}=I_2+I_3+ \ldots +I_n$ of the DC/DC converters 4.2-4.n assigned in each case to a fault-free DC sub-generator 5.2-5.n, in the direction of the DC/DC converter 4.1 assigned to the faulty DC source 2.1 (wherein $I_{Rest}=I_1$ in FIG. 1). Without further measures, the total current $I_{Rest}$ can assume values that may irreversibly damage overcurrent-sensitive components of the DC/DC converter 4.1 concerned. This is the case, in particular, when a fuse 9.1 connected in series to the faulty DC source 2.1 does not trip, or does not trip on time, in order to interrupt the fault current.

According to the disclosure, the fault 30 is detected by the control unit 15 based on the detected currents $I_1$-$I_n$ and/or voltages $U_1$-$U_n$. In response, in the above example with a fault 30 associated with DC source 2.1, the DC/DC converters 4.2-4.n assigned to respective fault-free DC sub-generators 5.2-5.n are operated by the control unit 15 with the aim that the common total current $I_{Rest}$ generated by them assumes a default value according to $I_{Rest}=I_2+I_3+ \ldots +I_n$. In this case, not only the default value itself but also the respective currents $I_2$-$I_n$ contributed by the individual DC/DC converters 4.2-4.n to achieve the shared default value can be predetermined from the outset. The default value is selected such that, on the one hand, damage to an overcurrent-sensitive component of the DC/DC converter 4.1 connected to the faulty DC sub-generator 5.1 is ruled out. Specifically, the default value can be selected such that it is smaller than a value of the overcurrent-sensitive component of the corresponding DC/DC converter 4.1. On the other hand, the default value is selected to be such (high), if possible, that a fuse 9.1 downstream of the faulty DC source 2.1 trips reliably and thus separates the faulty DC source 2.1 from the remaining fault-free DC sources 2.2-2.n. Since the DC/DC converters 4.1-4.n of the EEA 1 are DC/DC converters designed and configured for a step-down function, the DC/DC converters 4.2-4.n are capable of providing a sufficiently high total current $I_{Rest}$ at their output, even if irradiation on the DC sources 2.2-2.n configured as PV strings 3.1-3.n is relatively low. However, should the fuse 9.1 downstream of the faulty DC source 2.1 not trip before the i2t value of the overcurrent-sensitive component of the relevant DC/DC converter 4.1 is exceeded, damage to the overcurrent-sensitive component is avoided in that the total current $I_{Rest}$, under such conditions, is set to a value of 0 A by suitable operation of the remaining DC/DC converters 4.2-4.n. In particular, the remaining DC/DC converters 4.2-4.n can be deactivated in this case. The faulty DC sub-generator 5.1 can then be permanently and galvanically separated in the zero-current state, via a DC separator not shown in FIG. 1 (similar to the DC separators 13.1-13.n shown in FIG. 2), from the shared DC load 20 and the remaining fault-free DC sub-generators 5.2-5.n. Thereafter, the EEA 1 can be further operated without the defective DC sub-generator 5.1 but with the remaining fault-free DC sub-generators 5.2-5.n. The disconnected DC sub-generator 5.1 or its faulty DC source 2.1 can be repaired without hazard and can then be reconnected to the EEA 1. Thus the control unit 15 operates to set a first default value for the current upon detecting a fault that is non-zero to trip a fuse associated with the faulty DC source, and if the fuse does not trip in response to the first default value, a second default value for the current is set to about 0 A in order to for the faulty DC sub-generator to be galvanically separated via a DC separator (not explicitly shown in FIG. 1) arranged between the faulty DC sub-generator and the DC/DC-converter assigned thereto.

Although FIG. 1 shows only one faulty DC sub-generator 5.1, the method can also be applied to a case with a plurality of simultaneously present faulty DC sub-generators. This applies at least as long as a number of fault-free DC sub-generators outweighs a number of faulty DC sub-generators.

Figure 2:
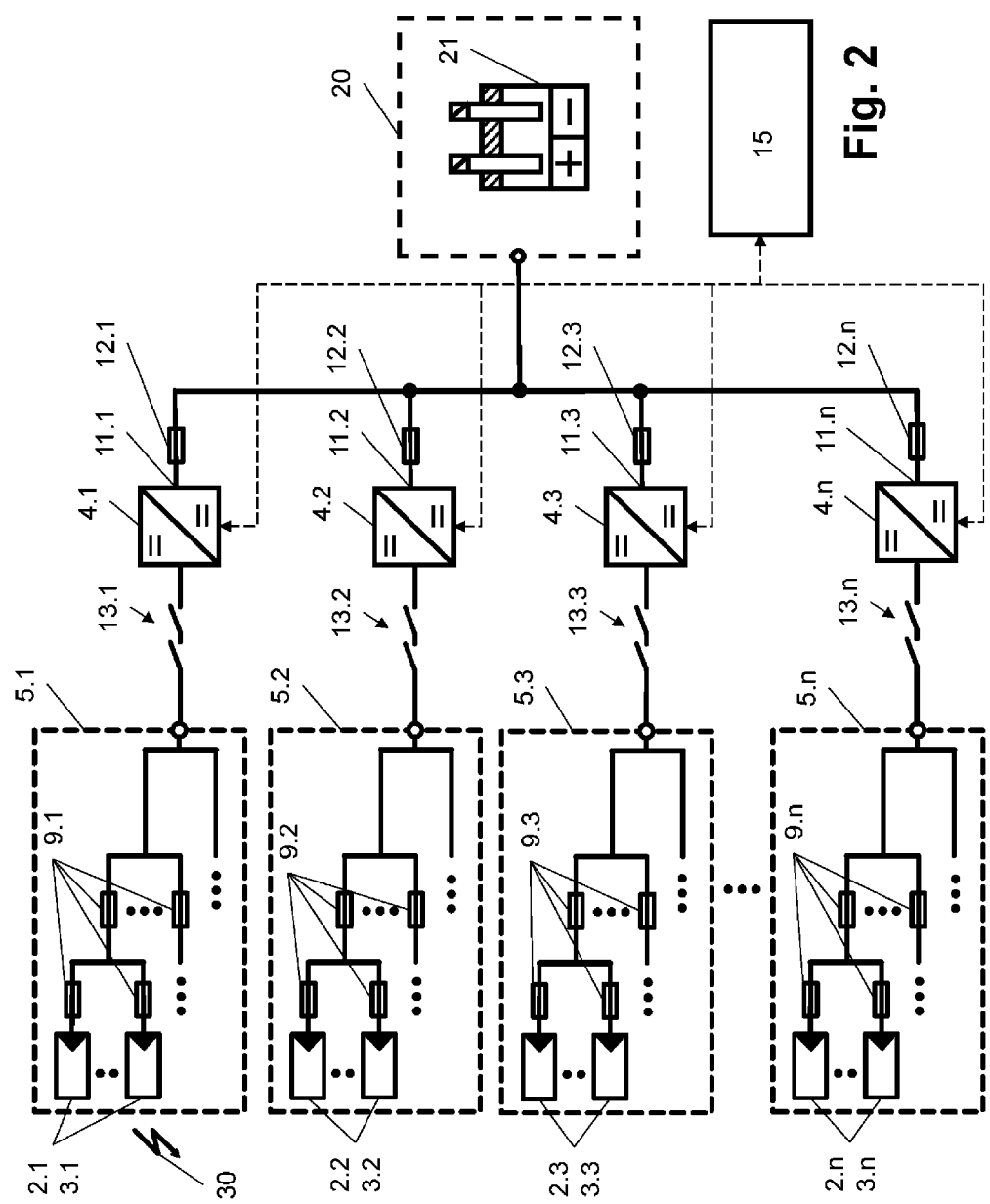
FIG. 2 shows an EEA according to the disclosure in a second embodiment.

FIG. 2 shows a second embodiment of an EEA 1 according to the disclosure, which in many features resembles the EEA 1 shown in FIG. 1. For the sake of clarity, reference is therefore made only to the differences to the first embodiment of the EEA 1, while reference is made to the descriptions in FIG. 1 with regard to identical features.

The EEA 1 shown in FIG. 2 also has a plurality of DC sub-generators 5.1-5.$n$, which are connected in each case in parallel with one another and to a shared DC load 20 via a DC/DC converter 4.1-4.$n$. However, in contrast to FIG. 1, each of the DC sub-generators 5.1-5.$n$ in FIG. 2 comprises a plurality of DC sources 2.1-2.$n$, which are each connected in parallel with one another and in each case via a series connection of a plurality of fuses 9.1-9.$n$ to the DC/DC converter 4.1-4.$n$ that is assigned to the respective DC sub-generator 5.1-5.$n$. Here, an i2t value of the fuses 9.1-9.$n$ within each of the series connections increases with increasing distance of the fuse 9.1-9.$n$ from the DC source 2.1-2.$n$ assigned thereto. A DC separator 13.1-13.$n$ is furthermore arranged between each of the DC sub-generators 5.1-5.$n$ and the DC/DC converter 4.1-4.$n$ assigned thereto, with which DC separator the corresponding DC sub-generator 5.1-5.$n$ can be galvanically separated from the DC/DC converter 4.1-4.$n$ assigned thereto. The DC separators 13.1-13.$n$ can advantageously be free of means for extinguishing an arc and can therefore be designed relatively cost-effectively.

Also in FIG. 2, currents $I_1$-$I_n$ and/or voltages $U_1$-$U_n$ of the DC sub-generators 5.1-5.$n$ are detected by measuring units of the DC/DC converters 4.1-4.$n$ (not shown in FIG. 2) and transmitted to the control unit 15. Should one of the currents $I_1$-$I_n$ and/or one of the voltages $U_1$-$U_n$ fall below the corresponding one of the threshold values $I_{TH}$, $U_{TH}$, this indicates a fault 30 of the corresponding DC sub-generator 5.1-5.$n$. FIG. 2 illustrates, by way of example, a fault 30 in the form of a short-circuit fault in the upper DC sub-generator 5.1, and there in the lower one of the DC sources 2.1 shown associated with the upper DC sub-generator 5.1. Here, too, the input voltage of the DC/DC converter 4.1 that is assigned to the faulty DC source 2.1 and thus also to the faulty DC sub-generator 5.1 or, in other words, connected thereto on the input side, drops. The relevant DC/DC converter 4.1 is no longer capable of providing, at its output 11.1, an output voltage $U_a$ identical to the other DC/DC converters 4.2-4.$n$; instead, the voltage drops there as well. As a result, here, the non-faulty DC/DC converters 5.2-5.$n$ also feed a total current $I_{Rest}$ into the one faulty DC/DC converter 5.1.

Similarly to the method already described in connection with FIG. 1, the fault 30 is detected by the control unit 15 monitoring the DC sub-generators 5.1-5.$n$. In response thereto, the remaining DC/DC converters 4.2-4.$n$ assigned in each case to a fault-free DC sub-generator 5.2-5.$n$ are operated via the control unit 15 with the aim that the total current $I_{Rest}$ generated by the remaining DC/DC converters 4.2-4.$n$ assumes a default value. In FIG. 2, as well, the default value is selected such (low) that, on the one hand, an overcurrent-sensitive component of the DC/DC converter 4.1 assigned to the faulty DC sub-generator 5.1 is protected and the damage thereof is avoided. On the other hand, however, it is also selected such (high) that a fuse 9.1 arranged within the series connection of fuses 9.1 between the faulty DC source 2.1 and the downstream DC/DC converter 4.1 trips. Since the i2t value of the fuses 9.1 within the series connection decreases with decreasing distance from the faulty DC source 2.1, tripping precisely the fuse connected directly downstream of the faulty DC source 2.1 is most likely. Advantageously, this fuse is also usually the most cost-effective one of the fuses 9.1 within the series connection.

Figure 3:
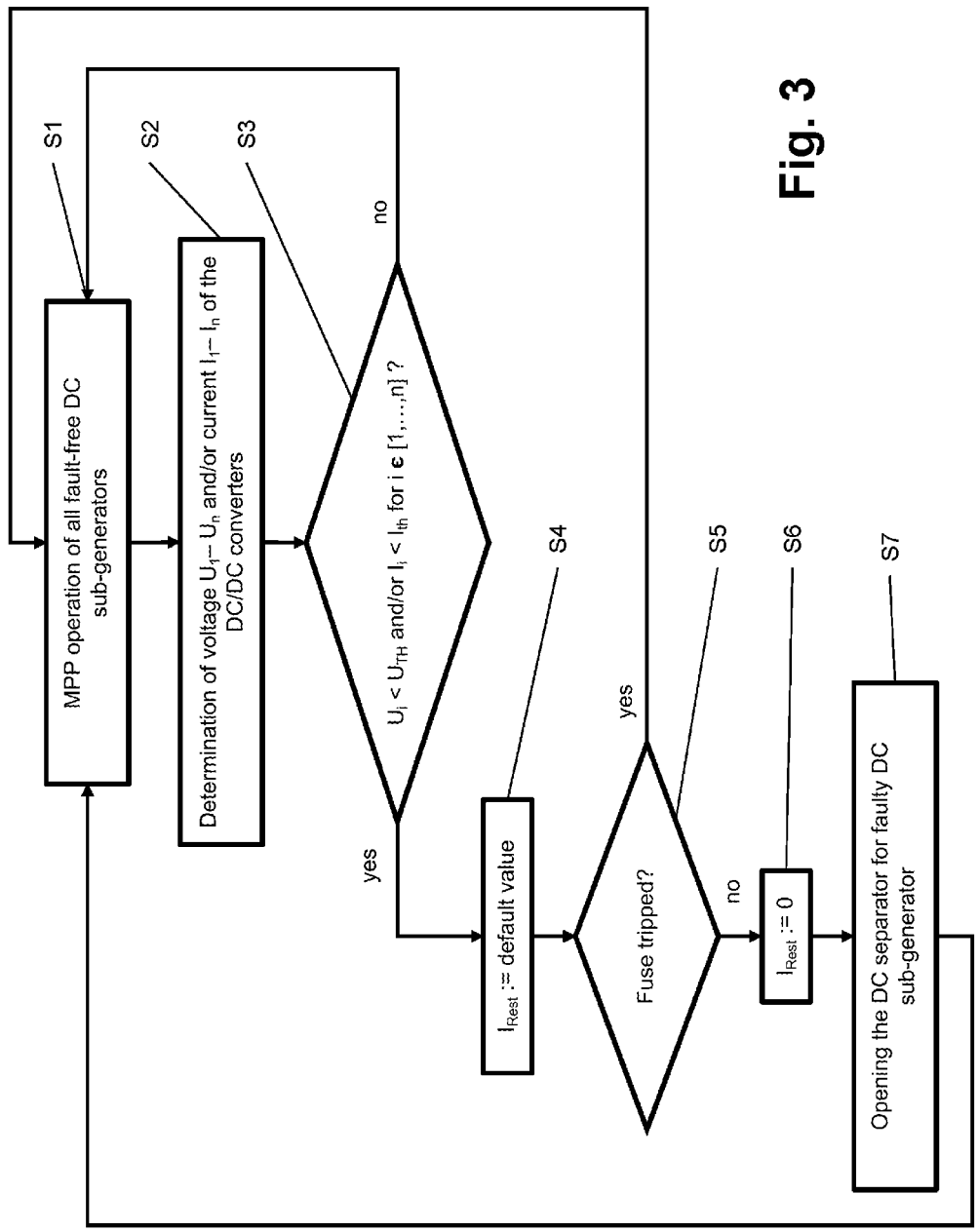
FIG. 3 shows a flowchart of the method according to the disclosure.

FIG. 3 shows a variant of the method according to the disclosure in the form of a flowchart, as can be carried out with the EEA 1 according to FIG. 1 or the EEA 1 according to FIG. 2. In a first act S1, the method starts with an MPP operation of all fault-free DC sub-generators 5.1-5.$n$. Since, at the beginning of the method, it is assumed by way of example that there are no faulty DC sources 2.1 and hence no faulty DC sub-generators 5.1, the number of all fault-free DC sub-generators corresponds at the beginning to the number of all available DC sub-generators 5.1-5.$n$ of the EEA 1. In a second act S2, all DC sub-generators 5.1-5.$n$ of the EEA 1 that are currently in operation are monitored for a fault 30. Monitoring takes place in that for each of the DC sub-generators 5.1-5.$n$ a voltage $U_1$-$U_n$ of the respective DC sub-generator 5.1-5.$n$ and/or for each of the DC/DC converters 4.1-4.$n$ a current $I_1$-$I_n$ flowing via the output 11.1-11.$n$ of the respective DC/DC converter 4.1-4.$n$ in the direction of the DC load 20 is detected and transmitted to the control unit 15. In a third act S3, the control unit 15 checks whether one of the detected voltages $U_1$-$U_n$ falls below a voltage threshold value $U_{TH}$ and/or whether one of the detected currents $I_1$-$I_n$ falls below a current threshold value $I_{TH}$. If this is not the case (NO at S3), the method jumps back to the first act S1. However, if one of the detected voltages $U_1$-$U_n$ falls below the voltage threshold value $U_{TH}$ and/or if one of the detected currents $I_1$-$I_n$ falls below the current threshold value $I_{TH}$ (YES at S3), it is indicated according to the method that the DC sub-generator 5.1-5.$n$ with the undershooting voltage $U_k$ and/or the undershooting current $I_k$ (with k=1 . . . n) is a faulty DC sub-generator 5.$k$ which has a faulty DC source 2.$k$. In this case, the method jumps to a fourth act S4, in which all remaining DC/DC converters 4.1-4.$n$ in operation that are not assigned to the faulty DC sub-generator 5.$k$ are operated via the control unit 15 with the aim that their total current $I_{Rest}$ assumes a default value. In one embodiment, the total current $I_{Rest}$ is hereby limited both upward and downward. A fifth act S5 checks whether the total current $I_{Rest}$ was capable of tripping a fuse 9.$k$ connected downstream of the faulty DC source 2.$k$. This can be checked, for example, by the detection of current $I_k$ and/or voltage $U_k$ of the DC/DC converter 4.$k$ assigned to the faulty DC sub-generator 5.$k$. It can be assumed that the fuse 9.$k$ did not trip (NO at S5) if a current $I_k$ flowing via the output 11.$k$ of the DC/DC converter 4.$k$ in the direction of the DC load continues to fall below the current threshold value $I_{TH}$ and/or if a voltage $U_k$ applied to the input 11.$k$ of the DC/DC converter 4.$k$ continues to fall below the voltage threshold value $U_{TH}$. If this is not the case, however, the method assumes that the fuse 9.$k$ connected downstream of the faulty DC source 2.$k$ has tripped (YES at S5) and as a result, the faulty DC source 2.$k$ has been separated from the shared DC load 20. Once the fuse 9.$k$ has tripped (YES at S5), the DC sub-generator previously indicated as a faulty DC sub-generator 5.$k$ shows exclusively fault-free DC sources 2.$k$, i.e., it can be referred to again as a fault-free DC sub-generator and can continue to be operated. Accordingly, when fuse 9.$k$ is tripped, the method jumps back to the first act S1, in which all fault-free DC sub-generators are again operated at their MPP. The number of DC sub-generators continues to correspond to the total number of DC sub-generators of the EEA 1. However, the DC sub-generator 5.$k$ previously identified as faulty now has at least one DC source 2.$k$ less than operating previously. If it is however concluded in the fifth act S5 that a fuse 9.$k$ connected downstream of the faulty DC source 2.$k$ did not trip (NO at S5), all remaining DC/DC converters 4.1-4.$n$ that are not assigned to the faulty DC sub-generator 5.$k$ are deactivated in a sixth act S6, as a result of which their total current $I_{Rest}$ assumes the value 0 A. In a seventh act S7, the faulty DC sub-generator 5.$k$ is then galvanically separated, via the DC separator 13.$k$ assigned to it, from the shared DC load 20 and from the remaining fault-free DC sub-generators. The method then jumps to the first act S1 in which all fault-free DC sub-generators are again operated at their respective MPP. However, the EEA 1 now continues to be operated without the DC sub-generator 5.$k$ previously identified as faulty; the number of fault-free DC sub-generators has decreased by 1 in this case.

The invention claimed is:

1. A method for operating an energy generating system comprising a plurality of DC sub-generators which are connected in parallel with one another and in each case to a shared DC load via a DC/DC converter, each of the DC sub-generators comprising a DC source which is connected, via at least one fuse that is connected in series to the DC source, to the DC/DC converter that is assigned to the respective DC sub-generator, comprising:
   monitoring each of the DC sub-generators for a short-circuit fault, and
   if the monitoring of the DC sub-generators indicates a faulty DC sub-generator,
   operating the DC/DC converters that are not assigned to the faulty DC sub-generator at a common total current ($I_{Rest}$) which corresponds to a default value,
   wherein the default value is selected such that a time integral formed from the common total current ($I_{Rest}$) falls below an i2t value of an overcurrent-sensitive circuit of the DC/DC converter that is assigned to the faulty DC sub-generator, or
   wherein the default value is selected such that a time integral formed from the common total current ($I_{Rest}$) exceeds an i2t value of the fuse that is connected in series to the DC/DC converter that is assigned to the faulty DC sub-generator, in order to trip the fuse.

2. The method according to claim 1, wherein monitoring the DC sub-generators comprises detecting a current flowing via each of the DC/DC converters, and indicating a faulty DC subgenerator when a current flowing from a respective one of the DC/DC converters in a direction of the shared DC load falls below a current threshold value ($I_{TH}$), or when the current flowing from a respective one of the DC/DC converters in the direction of the shared DC load changes its current direction, and/or wherein monitoring the DC sub-generators comprises detecting a voltage of each of the DC sub-generators, and indicating a faulty DC sub-generator when a detected voltage of a respective one of the DC sub-generators falls below a voltage threshold value ($U_{TH}$).

3. The method according to claim 2, wherein an input current or an output current of the DC/DC converter is detected as a detected current flowing via the DC/DC converter.

4. The method according to claim 1, wherein, when a tripping of the fuse at the selected default value does not take place, the DC/DC converters that are not assigned to the faulty DC sub-generator are deactivated in order to set the common total current ($I_{Rest}$) to a current value of 0 A.

5. The method according to claim 4, further comprising separating the faulty DC sub-generator from the shared DC load via a DC separation device.

6. The method according to claim 1, wherein a fault indicated during monitoring of the DC sub-generators, and a successful or unsuccessful tripping of the fuse, is signaled by a communication unit of an energy generating system (EEA).

7. An energy generating system comprising a plurality of DC sub-generators which are connected in parallel with one another and in each case to a shared DC load via a respective DC/DC converter, wherein each of the DC sub-generators comprises a DC source, which is connected, via at least one fuse that is connected in series to a respective DC source, to the DC/DC converter that is assigned to the respective DC sub-generator, the energy generating system further comprises a control unit which is configured to carry out a method according to claim 1.

8. The energy generating system according to claim 7, wherein the DC sub-generators in each case comprise a plurality of DC sources, which are connected in parallel with one another via at least one fuse to the DC/DC converter that is assigned to the respective DC sub-generator.

9. The energy generating system according to claim 7, wherein the DC sources comprise a photovoltaic (PV) string and/or a battery.

10. The energy generating system according to claim 7, wherein the shared DC load comprises an electrolyzer.

11. The energy generating system according to claim 7, wherein the DC/DC converters comprise a step-down converter, and/or wherein the DC/DC converters are configured as step-down DC/DC converters.

12. The energy generating system according to claim 7, wherein an overcurrent-sensitive component of the DC/DC converter that is assigned to the faulty DC source comprises a separate freewheeling diode, which is connected in parallel with a semiconductor switch of the DC/DC converter, or comprises a body diode of a semiconductor switch of the DC/DC converter.

13. The method according to claim 1, wherein:
   the default value is selected such that a time integral formed from the common total current ($I_{Rest}$) falls below an i2t value of an overcurrent-sensitive circuit of the DC/DC converter that is assigned to the faulty DC sub-generator, and
   the default value is selected such that a time integral formed from the common total current ($I_{Rest}$) exceeds an i2t value of the fuse that is connected in series to the DC/DC converter that is assigned to the faulty DC sub-generator, in order to trip the fuse.

* * * * *